Dec. 28, 1943.  H. M. HUGE  2,338,079
INVERTER CIRCUIT
Filed May 8, 1942

INVENTOR.
BY Henry M. Huge
Woodling and Krost
attys

Patented Dec. 28, 1943

2,338,079

UNITED STATES PATENT OFFICE 2,338,079

INVERTER CIRCUIT

Henry M. Huge, Lorain, Ohio, assignor, by mesne assignments, to Electronic Laboratories, Inc., a corporation of Indiana Application May 8, 1942, Serial No. 442,223

19 Claims. (Cl. 175—365)

This invention relates to inverters and more particularly to an inverter circuit capable of supplying constant voltage alternating current when supplied from a variable-voltage direct-current source.

It is an object of this invention to produce from a direct current source of variable voltage an alternating curernt voltage of constant magnitude.

Another object of my invention is to protect an inverter from possible damage due to overloads or short circuits.

Another object of my invention is to supply loads of widely varying power factor from an inverter and to protect the inverter from damage caused by poor power factor loads.

A further object of my invention is to supply a constant current to a variable load from an inverter.

Another object of my invention is to introduce desirable harmonics into the output and to provide means to control the amplitude of these harmonics.

A still further object of my invention is to reduce the undesirable harmonic content of the output voltage of an inverter.

Other objects and a better understanding of my invention may be had by reference to the following specification and claims, and the accompanying drawing, in which:

Figure 3:
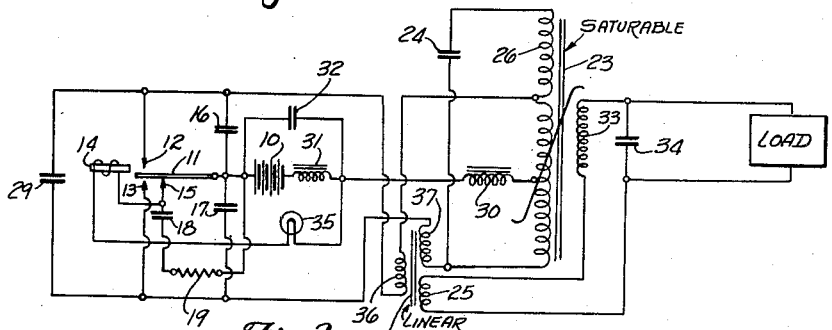
Figure 4:
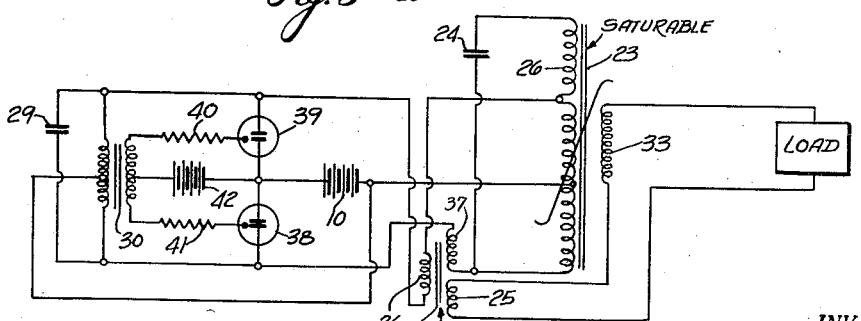

Figure 3 is a circuit diagram of the preferred embodiment of my invention as applied to a vibratory inverter, with the alternating current load circuit insulated from the direct current supply and with a filtering arrangement for preventing the inverter from influencing the direct current source, and Figure 4 is a circuit diagram of my invention as applied to an inverter using gas or vapor-filled triodes.

My invention relates to improvements in inverters and more particularly to regulating the output voltage, stabilizing the operation of the inverter on low power factor loads, and automatically protecting against overloads of any power factor. The invention also provides an improved method of introducing harmonics into the output and controlling their amplitude without changing the amplitude of the fundamental output frequency.

My invention is adapted to produce a constant voltage alternating current output when supplied with a variable voltage direct current. The operation of my inverter depends, in part, upon the non-linear characteristic of the parallel combination of a saturable inductance and a capacitor. The exciting current of this combination becomes inductive and of a large value when the applied voltage is very great and it reaches a large capacitive value when the applied voltage is small. At intermediate values of applied voltage the exciting current of this parallel combination passes through a minimum value and unity power factor. By supplying the exciting current of the parallel combination through a linear inductance, the voltage across the linear inductance tends to increase the voltage across the parallel combination when this voltage becomes too low and tends to decrease it when it becomes too large. By means of my invention I am able to take advantage of this characteristic in an inverter circuit. I accomplish this in spite of the fact that the current produced by the commutating means of the inverter is not simple alternating current in the ordinary sense but consists of pulsations of direct current. These pulsations have a wave form determined by the circuit constants and the character of the load. Consequently, the function of the circuit elements in my invention is not merely to regulate the output voltage of the inverter but also to control the character of the direct current pulses in a manner to make such regulation possible and to produce the desired wave shape. The inverter of my invention accomplishes both these functions and at the same time preserves the proper phase of the current pulses to maintain optimum commutation. The load may be supplied with the voltage from the parallel combination, or some voltage from the linear inductance may be added to this voltage to obtain better regulation as shown in Figure 3.

Figure 1:
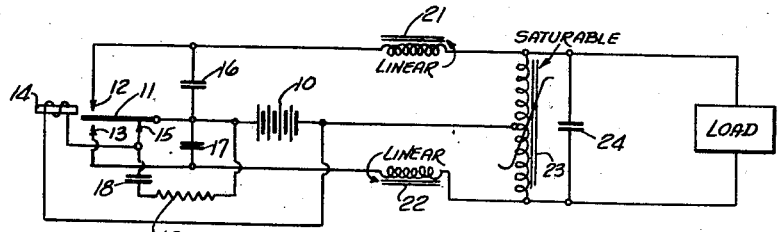
Figure 1 is a circuit diagram of an inverter embodying the features of my invention.

With more particular reference to Figure 1, there is shown a source of direct current 10 supplying a vibrator which is represented diagrammatically as a moving arm 11 which carries contacts adapted to alternately engage the stationary opposed contacts 12 and 13. The moving arm is magnetically actuated by a motor coil 14 which is energized through a separate contact 15. Capacitors 16 and 17 are provided to insure proper commutating action at the contacts 12 and 13 and capacitor 18 and resistor 19 improve the commutating action at contact 15. It is to be understood that the elements named above constitute a vibrator or pole-changer as used in the prior art and many variations in the arrangement of these parts are possible. For example, contact 15 may be omitted and the motor coil controlled through contact 12 or 13. Other modifications in the inverter arrangement are also possible, all that is required is a commutating or interrupting arrangement capable of inducing alternating current in saturable transformer 23.

In Figure 1, the saturable transformer 23 and capacitor 24 form a parallel combination which is connected directly in parallel with the load. Inductances 21 and 22 are energized by the load currents from contacts 12 and 13 respectively. I prefer to construct inductances 21 and 22 with substantially linear excitation characteristics and with substantially equal reactances.

The saturable transformer 23 has a center-tapped winding and the core is operated over a non-linear portion of its magnetization characteristic. The capacitor 24 passes capacitive current compensating for the inductive current of the transformer 23 and at the same time shunts the harmonics in the output voltage. Because of their association with the parallel combination of the transformer 23 and the capacitor 24, the inductances 21 and 22 produce voltages which add to or subtract from the variable voltage across the contacts 12 and 13 to maintain a substantially constant voltage across the load.

Figure 2:
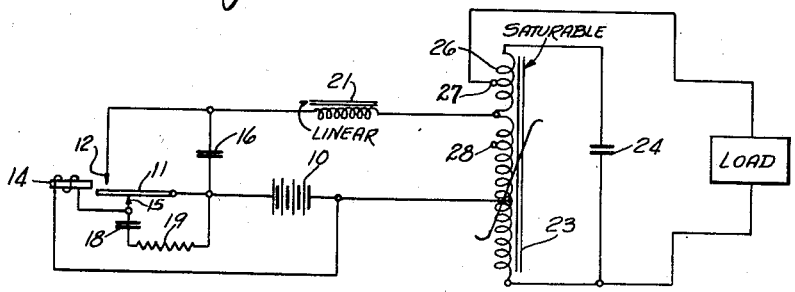
Figure 2 is a circuit diagram of a single contact or half-wave inverter embodying the features of my invention and adapted to supply any required output voltage.

Figure 2 is a circuit diagram illustrating how my invention may be applied to a half-wave inverter. In Figure 2, winding 26 is shown added to transformer 23. Winding 26 increases the voltage across capacitor 24 and effects an economy in permitting the use of a smaller high voltage capacitor in place of the large low-voltage capacitor required in the circuit of Figure 1. The taps 27 and 28 on transformer 23 in Figure 2 make it possible to supply a higher or respectively lower voltage to the load then would be supplied with the circuit of Figure 1. The parallel combination of capacitor 24 and saturable transformer 23, being effectively in parallel with the load, reduces the fluctuations in the voltage across the load, by drawing more inductive or less capacitive current through linear inductance 21 when the load voltage increases.

Figure 3 represents the preferred embodiment of my invention. It differs from Figure 1 chiefly in that the linear inductances 21 and 22 of Figure 1 are replaced in Figure 3 by transformer 20, which is also preferably made with a linear excitation characteristic.

The circuit of Figure 3 is capable of supplying a constant alternating voltage to the load over a wide range of direct current supply voltages. It is capable of supplying inductive or capacitive loads of poor power factor without danger of damage to the vibrator contacts. Similarly, overloads or short circuits do not cause arcing at the vibrator contacts or otherwise damage them.

In the circuit of Figure 3, saturable transformer 23 and capacitor 24 constitute a parallel combination which becomes inductive when the voltage across it is higher than a predetermined value and capacitive when the voltage across it is lower than that value. Windings 36 and 37 of transformer 20 carry alternate pulses of current from the direct current source 10. They are polarized so their direct current components oppose each other and they do not induce any appreciable unidirectional flux in the core of transformer 20. As a result of this method of polarizing the windings 36 and 37, the voltage appearing across either of the windings has a substantially symmetrical wave shape.

By causing both the positive and negative pulses to magnetize the same core, the magnetization of this core becomes effectively a symmetrical alternating current of the output frequency. Transformer 20 in my inverter circuit has an effect similar to that produced by an inductance in series with the load in an ordinary alternating current circuit. The voltage across transformer 20 adds vectorially to the commutated voltage across contacts 12 and 13 and maintains a substantially constant voltage across the load in spite of variations in the direct current voltage of source 10.

I have found that the addition of capacitor 29 across the contacts 12 and 13 improves the characteristics of my inverter. It aids in preventing arcing at the vibrator contacts when the load is suddenly short circuited and it aids in maintaining constant voltage and preserving the output voltage wave shape when the direct current voltage of source 10 is raised to an abnormally high value. The ballast lamp 35 in series with motor coil 14 is advantageous when the range of direct current input voltages is wide, because it aids in keeping the amplitude of vibration of the reed more nearly constant. High frequency filter choke 30 together with capacitor 34 reduces the high frequency components of the load voltage.

In many instances where the direct current source is used to supply other apparatus besides the inverter, it is desirable to prevent or reduce the flow of alternating current through the source 10. One case in which this is particularly necessary is when the source 10 is a telephone talking battery. The filter comprising choke 31 and capacitor 32 is used to prevent the current of the inverter from adversely influencing the voltage of source 10. At the same time, pulsations of the voltage of source 10 are absorbed by this filter and do not affect the inverter.

In the preferred embodiment of my invention as shown in Figure 3 the combination of saturable transformer 23 and capacitor 24 draws leading or lagging current through transformer 20 to maintain a constant load voltage. When the voltage across the saturable transformer 23 diminishes as a result of increased load or reduced direct current supply voltage, it draws less inductive or more capacitive current through linear transformer 20. The change in voltage across transformer 20 resulting from this change in current tends to increase the voltage across saturable transformer 23. This desirable effect is further aided by means of winding 25 in series with the secondary winding 33, which operates to further increase the voltage across the load. The voltage across the load is thus maintained substantially constant. I am also able to maintain an approximately sinusoidal wave shape across the load under wide variations of load and input voltage.

The use of winding 25 produces several advantages. It makes possible a more accurate regulation of the load voltage and increases the load capacity. In the circuit of Figure 1 slight changes in load voltage are required to make use of the voltage regulating properties of the circuit. With the addition of winding 25, the slight changes in the voltage across saturable transformer 23 which are required to actuate the voltage regulating properties of the circuit, need not cause corresponding fluctuations in the load voltage, because an additional portion of the correcting voltage induced in transformer 20 is inserted in series with the voltage across secondary winding 33. If desired, the load voltage in the circuit of Figure 3 can be caused to rise with increasing load or with decreasing battery voltage. The voltage across winding 25 also contains harmonics which are in some applications desirable in the output voltage. By increasing or decreasing the number of turns in winding 25 it is possible to regulate the harmonic content of the output voltage. As previously mentioned, the higher harmonics which are frequently undesirable may be suppressed through the use of inductance 30 and capacitor 34.

I am also able to obtain a constant current characteristic with the circuit of Figure 3. Normally, the circuit is adapted to supply a constant voltage to a variable impedance load. It is possible to adjust the circuit constants so that as the load impedance is dropped below the range of values where a constant voltage is maintained, another relatively wide range of impedances is encountered in which the load current is substantially constant and independent of the load impedance. Ordinarily, for circuits having the same full-load current, the short circuit current is less with the circuit arrangement of Figure 3 as compared with the arrangement of Figure 1.

In the circuit of Figure 3, loads of poor power factor, overloads, or short circuits do not cause excessive sparking at the vibrator contacts 12 and 13 or otherwise subject the vibrator to possible damage. Furthermore, under any conditions which would normally tend to cause arcing at contacts 12 and 13, that is, for example, if the voltage of source 10 should rise considerably above the values for which the unit is designed, the inductance of windings 21 and 22 of transformer 20 helps to minimize arcing by limiting the peak current and thus, in cooperation with capacitors 16, 17 and 29, prevents immediate damage to the vibrator.

With a direct current voltage variation of source 10 of plus or minus 20%, I have been able to maintain the voltage across the load constant within plus or minus 3% for all values of load from no load to full load, and even closer regulation is no doubt possible.

The operation of my invention as embodied in Figure 4 is similar to the operation described in connection with Figure 3. The vibratory pole changer of Figure 3 is replaced in Figure 4 by a pair of gas or vapor-filled triodes 38 and 39 operated as a self-excited full-wave inverter. Although I show the self-excitation of the grids accomplished through the use of transformer 30 and capacitor 29 in cooperation with the transformers 20 and 23 and capacitor 24, this may be accomplished by other means known to those skilled in the art. Direct current source 42 is used as a bias source for the control grids of the triodes 38 and 39. Resistors 40 and 41 protect the grids against excessive currents. My invention may be used with other types of commutating devices as well as those described and the method of application may be ascertained from the examples given in the foregoing specification.

In my invention the commutated current simultaneously excites a saturable flux path and a linear flux path, the capacitive means is excited by voltage proportional to the flux in the saturable flux path, the flux in the linear path changes in accordance with the fluctuations of the commutated voltage which are not absorbed by fluctuations in flux through the saturable flux path producing large flux changes in the linear path compared with the flux changes in the saturable path whereby the combination of elements operates to control the characteristics of the pulsating current to maintain a substantially constant output voltage of the desired wave shape across the load in spite of variations in the voltage of the direct current source and in spite of variations in the impedance of the load.

It will be apparent to those skilled in the art that the two transformers of the preferred embodiment of my invention may be incorporated in a single core construction, possibly using leakage shunts as are used in neon tube lighting transformers.

As is well known, a leakage reactance type transformer is equivalent to a transformer supplied through a series inductance, and if the portion of the core carrying the secondary winding is made saturable and the leakage shunt includes an air gap, then the single transformer can be constructed to be equivalent to the two transformers shown in Figures 3 and 4. In this case the primary wound on the common core might be center-tapped, a magnetic shunt with an air gap would be placed between the primary and the saturable portion of the core, and the secondary would be wound on the saturable portion and would supply both the capacitor and the load.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An inverter adapted to be energized from a source of direct current and to supply alternating current to a load, comprising, in combination, saturable inductance means arranged substantially in parallel circuit relationship with said load, capacitive means arranged in parallel circuit relationship with the saturable inductance means, contacting means adapted to induce alternating voltage in said saturable inductance means from the source of direct current, substantially linear inductance means adapted to carry the exciting current of said saturable means and said capacitive means and to produce a voltage adding vectorially to the voltage commutated by said contacting means and maintaining a substantially constant voltage across said load in spite of variations in the voltage of said direct current source.

2. In combination with a source of direct current and commutating means energized from said source to supply a pulsating direct current, a substantially linear inductive element, a saturable inductive element having a winding, a capacitor, circuit means connecting the linear inductive element substantially in series circuit relationship between the commutating means and said saturable inductive element, said circuit means supplying the pulsating direct current from said source to at least a portion of the winding of the saturable inductive element, the capacitor being arranged substantially in parallel with the saturable inductive element, and output means for supplying alternating current to a load substantially in parallel with said saturable inductive element.

3. Apparatus for converting direct to alternating current, comprising in combination, commutating means adapted to generate pulsations of direct current when energized from a direct current source, a saturable inductance element, a capacitive element arranged in parallel with the saturable inductance element, a linear inductance element adapted to conduct direct current pulses from said commutating means to the saturable inductance element, and circuit means for supplying alternating current to a load substantially in parallel with the saturable inductance element.

4. An inverter for supplying substantially constant potential alternating current when energized from a variable voltage source of direct current, comprising in combination, a pole changer having two contacts adapted to be alternately connected to the source of direct current through a contacting member connected to said source, a first capacitor connected across said two contacts, a saturable inductive element having two windings, one energized from each of said two contacts, a linear inductive element having two windings, one energized from each of said two contacts, a second capacitor connected in parallel with said saturable inductive element, output means in parallel with the saturable inductive element, and a third winding on the linear inductive element, said third winding being in series with the output means.

5. In combination, saturable inductance means, capacitive means, and linear inductance means, means for supplying pulsations of direct current to the saturable inductance through the linear inductance means, circuit means connecting said capacitive means in parallel with said saturable inductance means, and output means for supplying alternating current to a load substantially in parallel with the saturable inductance means.

6. An inverter for supplying substantially constant potential alternating current when energized from a variable voltage source of direct current, comprising in combination, a pole changer having two contacts adapted to be alternately connected to the source of direct current through a contacting member connected to said source, a first capacitor connected across the two contacts, a saturable inductive element having two windings one energized from each of said two contacts, a first linear inductive element having two windings, one energized from each of said two contacts, a second capacitor connected in parallel with said saturable inductive element, output means in parallel with the saturable inductive element, a third winding on the first linear inductive element, said third winding being in series with the output means, and output filtering means comprising a third capacitor in parallel with the load, and a second linear inductance in series with the source of direct current.

7. In combination with a source of direct current, commutating means for producing pulses of direct current, a saturable inductive element having two winding portions, each connected to said commutating means and receiving alternate direct current pulses, the two winding portions being oppositely polarized so that the direct current pulses through one portion produce flux opposite and substantially equal to that produced by the direct current pulses through the other portion, a substantially linear inductive element having two windings connected between said commutating means and said saturable inductive element, each of the two windings on said linear element being connected to one of the two winding portions on the saturable element and being oppositely polarized so that the direct current pulses through one winding produce flux opposite and substantially equal to the direct current pulses through the other winding, a capacitor connected in parallel with said saturable inductive element, output means for supplying alternating current to a load, and a third winding on said linear inductive element, said third winding being connected in series with the load.

8. A device for generating constant-potential alternating current when energized from a variable-voltage source of direct current, comprising, in combination, pole changing means adapted to receive energy from the direct current source and convert it into direct current pulsations, a saturable magnetic unit with windings adapted to use the direct current pulses in generating an alternating voltage, linear inductance means, and a capacitor, said capacitor together with the saturable magnetic unit forming a parallel combination having an impedance changing with the applied alternating voltage, the exciting current of said parallel combination generating voltage across the linear inductance means, circuit means for utilizing the voltage across the linear inductance means to compensate for fluctuations in the alternating voltage and to supply constant output voltage.

9. A circuit for obtaining a substantially constant alternating current output voltage from a variable voltage direct current source comprising, in combination, commutating means, a saturable transformer having output means, a capacitor, and a linear transformer having a plurality of windings, said capacitor being connected in shunt relationship with said saturable transformer, said plurality of windings on the linear transformer connecting said commutating means with the saturable transformer, the output means of said saturable transformer being connected in series with one of the plurality of windings on said linear transformer.

10. In combination, a saturable inductance element, a capacitor, and a substantially linear inductance element, means for supplying pulsations of direct current to the saturable inductance element through the linear inductance element, circuit means connecting said capacitor in parallel with said saturable inductance element, output means for supplying substantially constant voltage alternating current to a load substantially in parallel with said capacitor, said output means including circuit means for adding voltage from the linear inductance element in series with the load.

11. A circuit for obtaining a substantially constant alternating current output voltage from a variable voltage direct current source comprising, in combination, electric discharge valve commutating means, a saturable transformer having output means, a capacitor, and a linear transformer having a plurality of windings, said capacitor being connected in shunt relationship with said saturable transformer, the plurality of windings on the linear transformer connecting said commutating means with the saturable transformer.

12. In combination, saturable inductance means, capacitive means, and linear inductance means, electric discharge valve commutating means for supplying pulsations of direct current to the saturable inductance through the linear inductance means, circuit means connecting said capacitive means in parallel with said saturable inductance means, and output means for supplying alternating current to a load substantially in parallel with the saturable inductance means.

13. In combination, a saturable inductance element, a capacitor, and a substantially linear inductance element, electric discharge valve commutating means for supplying pulsations of direct current to the saturable inductance element through the linear inductance element, circuit means connecting said capacitor in parallel with said saturable inductance element, output means for supplying substantially constant voltage alternating current to a load substantially in parallel with said capacitor, said output means including circuit means for adding voltage from the linear inductance element in series with the load.

14. An inverter adapted to be energized from a source of direct current and to supply alternating current to a load, comprising, in combination, saturable inductance means arranged substantially in parallel circuit relationship with said load, capacitive means arranged in parallel circuit relationship with the saturable inductance means, electric discharge valve commutating means adapted to induce alternating voltage in said saturable inductance means from the source of direct current, substantially linear inductance means adapted to carry the exciting current of said saturable means and said capacitive means and to produce a voltage adding vectorially to the voltage commutated by said contacting means and maintaining a substantially constant voltage across said load in spite of variations in the voltage of said direct current source.

15. In combination with commutating means for supplying a pulsating direct current, a first transformer having a first and a second winding, a second transformer having a first and a second winding, first circuit means for connecting the said first windings of said transformers in series with each other and with the commutating means, second circuit means for connecting the said second windings of said transformers in series with each other and with the commutating means, said second windings of the transformers substantially nullifying the unidirectional flux induced in the transformers by the said first windings, and an output load circuit connected to both the transformers and adapted to take voltages in series from both transformers for supplying the load.

16. In combination with commutating means for supplying a pulsating direct current, a linear transformer having a first and a second winding, a saturable transformer having a first and a second winding, a capacitor in shunt with said saturable transformer, first circuit means for connecting the said first winding of each said transformer in series with each other and with the commutating means, second circuit means for connecting the said second winding of each said transformer in series with each other and with the commutating means, said second windings of the transformers substantially nullifying the unidirectional flux induced in the transformers by the said first windings, and an output load circuit connected to both the transformers and adapted to take voltages in series from both transformers for supplying the load.

17. In combination with commutating means adapted to produce pulsations of direct current when energized from a source of direct current, magnetic means comprising a plurality of magnetic flux paths, one of said flux paths being saturable, another being substantially linear, winding means adapted to simultaneously magnetize said flux paths when energized with said direct current pulsations and to produce total flux linkages between the flux in said paths and said winding means corresponding to the voltage of said source of direct current, capacitive means, first circuit means supplying voltage to said capacitive means in proportion to the flux in said saturable flux path, and second circuit means for supplying a load with voltage induced by the flux in said saturable flux path.

18. In combination with commutating means adapted to produce pulsations of direct current when energized from a source of direct current, magnetic means comprising a plurality of magnetic flux paths, one of said flux paths being saturable, another being substantially linear, winding means adapted to use said pulsations of direct current to simultaneously magnetize said flux paths, capacitive means, first circuit means adapted to supply said capacitive means with voltage proportional to the flux in said saturable flux path, means for producing large flux changes in said linear path compared with the flux changes in said saturable path in response to fluctuations in the commutated voltage, and second circuit means for supplying a load with substantially constant alternating voltage.

19. In combination with commutating means adapted to produce pulsations of direct current when energized from a source of direct current, magnetic means comprising a plurality of magnetic flux paths, one of said flux paths being saturable, another being substantially linear, winding means adapted to simultaneously magnetize said flux paths when energized with said direct current pulsations and to produce total flux linkages between the flux in said paths and said winding means corresponding to the voltage of said source of direct current, capacitive means, first circuit means supplying voltage to said capacitive means in proportion to the flux in said saturable flux path, and second circuit means for supplying a load with voltage induced by the flux in said saturable flux path.

HENRY M. HUGE.